United States Patent
Paulsen et al.

(10) Patent No.: US 9,058,082 B2
(45) Date of Patent: Jun. 16, 2015

(54) SYNCHRONOUS TIMED ORTHOGONAL MEASUREMENT PATTERN FOR MULTI-TOUCH SENSING ON A TOUCHPAD

(75) Inventors: Keith L. Paulsen, Centerville, UT (US); Paul Vincent, Fruit Heights, UT (US); Jared G. Bytheway, Sandy, UT (US)

(73) Assignee: CIRQUE CORPORATION, Salt Lake City, UT (US)

( * ) Notice: Subject to any disclaimer, the term of this patent is extended or adjusted under 35 U.S.C. 154(b) by 0 days.

(21) Appl. No.: 12/855,545

(22) Filed: Aug. 12, 2010

(65) Prior Publication Data

US 2011/0037724 A1 Feb. 17, 2011

Related U.S. Application Data

(60) Provisional application No. 61/233,410, filed on Aug. 12, 2009.

(51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01); *G06F 2203/04808* (2013.01)

(58) Field of Classification Search
USPC ...................... 345/173–178; 178/18.01–18.11
See application file for complete search history.

(56) References Cited

U.S. PATENT DOCUMENTS

| | | | |
|---|---|---|---|
| 6,856,259 B1 * | 2/2005 | Sharp ................................ 341/5 |
| 2006/0158202 A1 | 7/2006 | Umeda et al. | |
| 2006/0284839 A1 | 12/2006 | Breed et al. | |
| 2007/0109274 A1 | 5/2007 | Reynolds | |
| 2008/0062148 A1 | 3/2008 | Hotelling et al. | |
| 2008/0079699 A1 * | 4/2008 | Mackey ........................ 345/174 |
| 2008/0158167 A1 * | 7/2008 | Hotelling et al. ............. 345/173 |
| 2008/0158172 A1 | 7/2008 | Hotelling et al. | |
| 2008/0162996 A1 | 7/2008 | Krah et al. | |
| 2008/0309623 A1 | 12/2008 | Hotelling et al. | |
| 2008/0309625 A1 * | 12/2008 | Krah et al. .................... 345/173 |
| 2009/0051671 A1 * | 2/2009 | Konstas ........................ 345/174 |
| 2009/0096757 A1 | 4/2009 | Hotelling et al. | |
| 2009/0096758 A1 * | 4/2009 | Hotelling et al. ............. 345/173 |
| 2009/0127005 A1 * | 5/2009 | Zachut et al. ............... 178/18.03 |
| 2009/0189867 A1 | 7/2009 | Krah | |
| 2009/0273579 A1 * | 11/2009 | Zachut et al. ................. 345/174 |
| 2010/0321332 A1 * | 12/2010 | Oda et al. ....................... 345/174 |
| 2011/0007021 A1 * | 1/2011 | Bernstein et al. ............. 345/174 |

FOREIGN PATENT DOCUMENTS

| | | |
|---|---|---|
| EP | 1536368 A1 | 6/2005 |
| JP | 01211117 | 8/1989 |
| JP | 2005152223 A | 6/2005 |
| JP | 2008294598 | 12/2008 |
| JP | 2009516295 A | 4/2009 |
| WO | 2007058727 A1 | 5/2007 |

* cited by examiner

*Primary Examiner* — Ariel Balaoing
(74) *Attorney, Agent, or Firm* — Morris O'Bryant Compagni, PC

(57) ABSTRACT

A method for detecting multiple objects on a touchpad having a grid of orthogonal electrodes, wherein all drive electrodes are simultaneously stimulated, and then frequency or electrode coding is used to separate each electrode junction and produce a capacitance image of the touchpad surface in a single measurement sequence.

7 Claims, 23 Drawing Sheets

$$W(4) = \begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

| t     | 1  | 2  | 3  | 4 |
|-------|----|----|----|---|
| D1(t) | 1  | 1  | 1  | 1 |
| D2(2) | -1 | -1 | 1  | 1 |
| D3(t) | 1  | -1 | -1 | 1 |
| D4(t) | -1 | 1  | -1 | 1 |

FIGURE 5

```
S(t)  = sum of junction currents

```
Measurement₅(t) in matrix summary form:

$$J_{ds} = \sum_{t=1} \text{Pattern}_d(t) * \text{Measurement}_s(t)$$

| $J_{ds}$ | S1 | S2 | S3 | S4 |
|---|---|---|---|---|
| D1 | 4 | 4 | 4 | 4 |
| D2 | 4 | 0 | 4 | 4 |
| D3 | 4 | 4 | 0 | 4 |
| D4 | 4 | 4 | 4 | 4 |

FIGURE 9

16x16 CDMA Patterns

SENSOR

| 77 | 77 | 77 | 77 | 77 | 77 | 77 | 77 | 77 | 77 | 77 | 77 | 77 | 77 | 77 | 77 |
|----|----|----|----|----|----|----|----|----|----|----|----|----|----|----|----|
| 77 | 77 | 77 | 77 | 77 | 77 | 77 | 77 | 77 | 77 | 77 | 77 | 77 | 77 | 77 | 77 |
| 77 | 77 | 77 | 77 | 77 | 77 | 77 | 77 | 77 | 77 | 77 | 77 | 77 | 77 | 77 | 77 |
| 77 | 77 | 77 | 77 | 77 | 77 | 77 | 77 | 77 | 77 | 77 | 77 | 77 | 77 | 77 | 77 |
| 77 | 77 | 22 | 77 | 44 | 77 | 77 | 77 | 77 | 77 | 77 | 77 | 77 | 77 | 77 | 77 |
| 77 | 77 | 77 | 77 | 77 | 77 | 77 | 77 | 77 | 77 | 77 | 77 | 77 | 77 | 77 | 77 |
| 77 | 77 | 77 | 77 | 77 | 77 | 77 | 77 | 33 | 77 | 77 | 77 | 77 | 77 | 77 | 77 |
| 77 | 77 | 77 | 77 | 77 | 77 | 77 | 77 | 77 | 77 | 77 | 77 | 77 | 77 | 77 | 77 |
| 77 | 77 | 77 | 77 | 77 | 77 | 77 | 77 | 77 | 77 | 77 | 77 | 77 | 77 | 77 | 77 |
| 77 | 77 | 77 | 77 | 77 | 77 | 77 | 77 | 77 | 77 | 77 | 77 | 55 | 77 | 77 | 77 |
| 77 | 77 | 15 | 77 | 33 | 77 | 77 | 77 | 77 | 77 | 77 | 77 | 77 | 77 | 77 | 77 |
| 77 | 77 | 77 | 77 | 77 | 77 | 77 | 77 | 77 | 77 | 77 | 77 | 77 | 77 | 77 | 77 |
| 77 | 77 | 77 | 77 | 77 | 77 | 77 | 77 | 77 | 77 | 77 | 77 | 77 | 77 | 77 | 77 |
| 77 | 77 | 77 | 77 | 77 | 77 | 77 | 77 | 77 | 77 | 77 | 77 | 77 | 77 | 77 | 77 |
| 77 | 77 | 77 | 77 | 77 | 77 | 77 | 77 | 77 | 77 | 77 | 77 | 77 | 77 | 77 | 77 |
| 77 | 77 | 77 | 77 | 77 | 77 | 77 | 77 | 77 | 77 | 77 | 77 | 77 | 77 | 77 | 77 |

FIGURE 11

MEASUREMENT (THEORETICAL)

| | | | | | | | | | | | | | | | |
|---|---|---|---|---|---|---|---|---|---|---|---|---|---|---|---|
| 0 | 0 | -117 | 0 | -77 | 0 | 0 | 0 | -44 | 0 | 0 | 0 | 22 | 0 | 0 | 0 |
| 0 | 0 | 7 | 0 | 11 | 0 | 0 | 0 | 44 | 0 | 0 | 0 | -22 | 0 | 0 | 0 |
| 0 | 0 | 7 | 0 | 11 | 0 | 0 | 0 | 44 | 0 | 0 | 0 | 22 | 0 | 0 | 0 |
| 0 | 0 | -7 | 0 | -11 | 0 | 0 | 0 | 44 | 0 | 0 | 0 | -22 | 0 | 0 | 0 |
| 0 | 0 | -7 | 0 | -11 | 0 | 0 | 0 | 44 | 0 | 0 | 0 | 22 | 0 | 0 | 0 |
| 0 | 0 | 117 | 0 | 77 | 0 | 0 | 0 | -44 | 0 | 0 | 0 | -22 | 0 | 0 | 0 |
| 0 | 0 | 117 | 0 | 77 | 0 | 0 | 0 | -44 | 0 | 0 | 0 | 22 | 0 | 0 | 0 |
| 0 | 0 | 7 | 0 | 11 | 0 | 0 | 0 | -44 | 0 | 0 | 0 | 22 | 0 | 0 | 0 |
| 0 | 0 | 7 | 0 | 11 | 0 | 0 | 0 | -44 | 0 | 0 | 0 | -22 | 0 | 0 | 0 |
| 0 | 0 | -117 | 0 | -77 | 0 | 0 | 0 | 44 | 0 | 0 | 0 | 22 | 0 | 0 | 0 |
| 0 | 0 | -117 | 0 | -77 | 0 | 0 | 0 | 44 | 0 | 0 | 0 | -22 | 0 | 0 | 0 |
| 0 | 0 | 117 | 0 | 77 | 0 | 0 | 0 | 44 | 0 | 0 | 0 | 22 | 0 | 0 | 0 |
| 0 | 0 | 117 | 0 | 77 | 0 | 0 | 0 | 44 | 0 | 0 | 0 | -22 | 0 | 0 | 0 |
| 0 | 0 | -7 | 0 | -11 | 0 | 0 | 0 | -44 | 0 | 0 | 0 | 22 | 0 | 0 | 0 |
| 0 | 0 | -7 | 0 | -11 | 0 | 0 | 0 | -44 | 0 | 0 | 0 | -22 | 0 | 0 | 0 |

FIGURE 12

NORMALIZED
CAPACITANCE
ARRAY

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | -880 | 0 | -528 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | -704 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | -352 | 0 | 0 | 0 | 0 |
| 0 | 0 | -992 | 0 | -704 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIGURE 13

SYNCHRONOUS TIMED ORTHOGONAL MEASUREMENT PATTERN FOR MULTI-TOUCH SENSING ON A TOUCHPAD

CROSS REFERENCE TO RELATED APPLICATIONS

This document claims priority to and incorporates by reference all of the subject matter included in the provisional patent application Ser. No. 61/233,410.

BACKGROUND OF THE INVENTION

1. Field of the Invention

This invention relates generally to touchpads, touch screens and touch panels. More specifically, the present invention is a method for using data from a touch sensitive surface that uses two sets of orthogonal electrodes to detect and track multiple objects that are touching the surface thereof.

2. Description of Related Art

When discussing touchpads, it is noted that there are several different designs for capacitance sensitive touchpads. One of the existing touchpad designs that can be modified to work with the present invention is a touchpad made by CIRQUE® Corporation. Accordingly, it is useful to examine the underlying technology to better understand how any capacitance sensitive touchpad can be modified to work with the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18, of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Pointing object position determination is then performed by using an equation that compares the magnitude of the two signals measured.

The sensitivity or resolution of the CIRQUE@ Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention.

The process above is repeated for the Y or column electrodes 14 using a P, N generator 24.

Although the CIRQUE® touchpad described above uses a grid of X and Y electrodes 12, 14 and a separate and single sense electrode 16, the sense electrode can actually be the X or Y electrodes 12, 14 by using multiplexing. Either design will enable the present invention to function.

The underlying technology for the CIRQUE® Corporation touchpad is based on capacitive sensors. However, other touchpad technologies can also be used for the present invention. These other proximity-sensitive and touch-sensitive touchpad technologies include electromagnetic, inductive, pressure sensing, electrostatic, ultrasonic, optical, resistive membrane, semi-conductive membrane or other finger or stylus-responsive technology.

There are several different technologies that can be used to detect objects on touch sensitive surfaces. When referring to the device having the touch sensitive surface, this document might be referring to touchpads, touch screens, touch panels, or any other device that incorporates a touch sensitive surface and uses electrodes that are both disposed in an orthogonal arranged but are in parallel planes. For simplicity, this document will refer to such devices as "touchpads" throughout this document, but it should be considered as referring to any device having a touch sensitive surface with orthogonal electrodes.

The prior art includes a description of a touchpad that is already capable of the detection and tracking of multiple objects on a touchpad. This prior art patent teaches and claims that the touchpad detects and tracks individual objects anywhere on the touchpad. The patent describes a system whereby objects appear as a "maxima" on a curve. Consequently, there is also a "minima" which is a low segment of the curve where there is no detection of an object. FIG. 2 is a graph illustrating the concept of a first maximum 30, a minimum in-between, and a second maximum 34 that is the result of the detection of two objects on a touchpad.

It would be an advantage over the prior art to provide a new detection and tracking method that does not need to scan for maxima or minima of multiple objects in order to determine the presence or the location of the multiple objects on the touch sensitive surface.

BRIEF SUMMARY OF THE INVENTION

In a first embodiment, the present invention is a method for detecting multiple objects on a touchpad having a grid of orthogonal electrodes, wherein all drive electrodes are simultaneously stimulated, and then frequency or electrode coding is used to separate each electrode junction and produce a capacitance image of the touchpad surface in a single measurement sequence.

In a first aspect of the invention, the entire surface of the touchpad is viewed in a single measurement.

In a second aspect of the invention, the system enables reporting of pressure and width of each contact.

In a third aspect of the invention, the system provides strong immunity to noise.

In a fourth aspect of the invention, ghosting of contacts is eliminated.

These and other objects, features, advantages and alternative aspects of the present invention will become apparent to those skilled in the art from a consideration of the following detailed description taken in combination with the accompanying drawings.

BRIEF DESCRIPTION OF THE SEVERAL VIEWS OF THE DRAWINGS

FIG. 5 is a matrix showing the STOMP electrode patterns used in the drive electrodes of FIG. 4.

FIG. 6 is a list showing the induced current in each sense electrode, which is the sum of the currents induced at each junction along the sense electrode.

FIG. 7 is a matrix summary of the measurements shown in FIG. 6.

FIG. 8 shows the computation of the dot product for measurements shown in FIGS. 6 and 7.

FIG. 9 shows the dot product in matrix summary form.

FIG. 10 is provided as a table of STOMP patterns that can be used with a 16×16 electrode grid.

FIG. 11 is a table showing an example of measurement values that are generated using the STOMP patterns shown in FIG. 10.

FIG. 12 is a table of theoretical ADC measurements.

FIG. 13 is a table that shows the resulting image of junction capacitance.

DETAILED DESCRIPTION OF THE INVENTION

Figure 1:
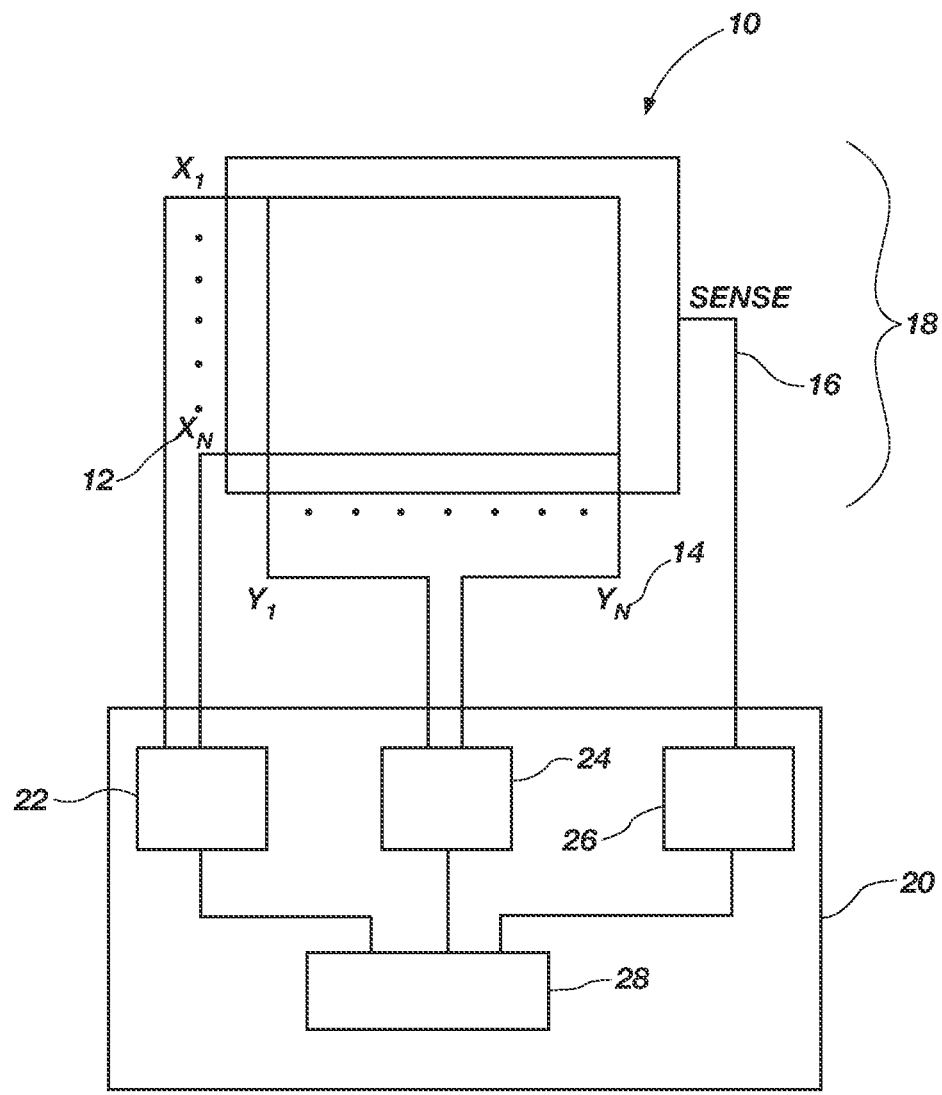
FIG. 1 is a block diagram of operation of a first embodiment of a touchpad that is found in the prior art, and which is adaptable for use in the present invention.
Figure 2:
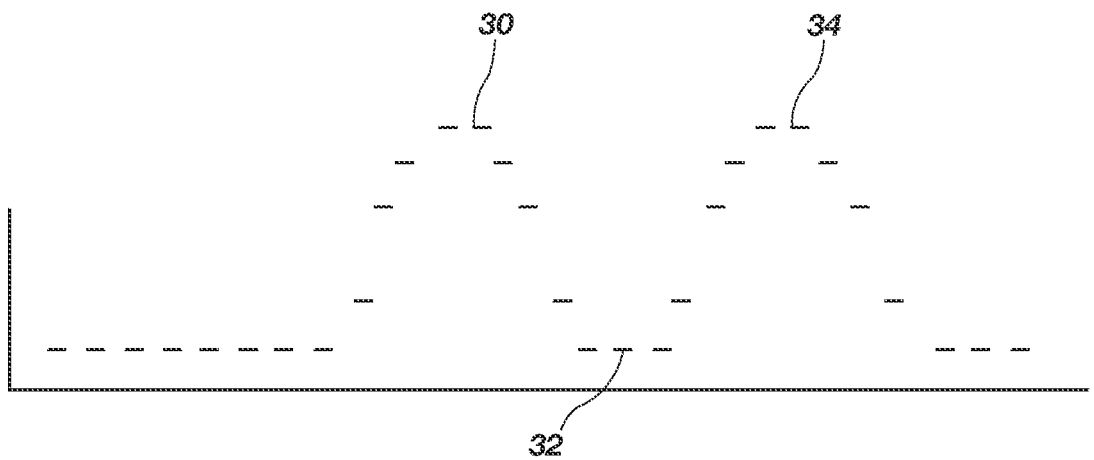
FIG. 2 is a graph illustrating the concept of a first maxima, a minima in-between, and a second maxima.

Reference will now be, made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

In a first embodiment of the invention, the present invention addresses the problems of improving noise performance and detecting multiple contacts on a capacitance sensitive surface using Synchronous Timed Orthogonal Measurement Patterns (STOMP). Noise performance can be greatly enhanced by continuously exciting and collecting data from all electrodes continuously, and at the same time. Noise immunity and accuracy is further improved using correlation of stochastic data for computing contact position(s).

With the growing use of inexpensive switching power supplies for computing devices there is an increase in the amount of broadband noise in laptop computers and other computing equipment utilizing touch input sensors such as touchpads. This interference produces an environment where traditional techniques of noise avoidance are becoming more difficult.

There is also a growing demand for measuring the position of multiple contacts on a capacitance sensing surface. Measuring the position of multiple contacts differs from measuring the position of a single contact. Using the new method of the present invention, it is possible to measure the change in capacitance of every junction of orthogonally arranged electrodes in order to uniquely identify multiple contacts on a surface. This differs significantly from simply identifying maxima and minima as will be explained.

Prior art methods for detecting multiple objects on a capacitance sensing surface include energizing electrodes in a scanning pattern using a periodic signal and searching for maxima separated by minima. The periodic signal is applied to the successive individual electrodes and resulting current integrated over several periods. A relatively large number of periods are required in order to integrate a large enough signal above the noise to make a measurement. Furthermore, the size of the surface scanned is limited because the entire surface must be scanned within a given measurement report rate.

The periodic signal is also confined by the frequency response of the electrode and the contact interaction. The frequency response of a typical capacitance touchpad with a human finger has been determined in the lab to be most sensitive to a human finger's position approximately between 600 KHz to 1200 KHz. This band of frequencies is often occupied with switching power supply noise and radio interference requiring significant time averaging to produce a noiseless result.

A new method of continuously exciting all drive electrodes can improve immunity from noise and track large numbers of contacts with improved sample rate using STOMP. An analogy to the problem of detecting the presence and location of multiple contacts on a surface is a room in which people wish to communicate with each other. To avoid confusion, people could take turns speaking (time division), speak at different pitches (frequency division), or speak in different languages (code division).

Prior art methods typically depend on taking turns stimulating various electrodes. In other words time division which translates to a lower signal to noise and limited performance. In contrast, the present invention continuously stimulates all drive electrodes and utilizes frequency (FDMA) and/or electrode coding (CDMA) to separate each junction and produce a capacitance image of the surface.

The present invention utilizes the principle of orthogonality to separate measurement information. In other words, stimulus comes from electrodes that are orthogonal to the electrodes being measured. Then the present invention uses mathematical principles regarding orthogonality to separate data that is essentially multiplied together. The sensing information that is available at each electrode junction is then separated so that a complete capacitive picture is generated for the entire electrode grid, and consequently the entire touchpad.

Electrodes can be orthogonal physically and mathematically. In mathematics, two vectors are orthogonal of they are perpendicular, i.e., they form a right angle.

The present invention uses coding of data. Specifically, a first embodiment adapts the concept of CDMA or code division multiple access. Code division multiple access is a channel access method utilized by various radio communication technologies. It should not be confused with the mobile phone standards also called and CDMA.

One of the basic concepts in data communication is the idea of allowing several transmitters to send information simultaneously over a single communication channel. This allows several users to share a bandwidth of frequencies. This concept is called multiplexing. CDMA employs spread-spectrum technology and a special coding scheme (where each transmitter is assigned a code) to allow multiple users to be multiplexed over the same physical channel. CDMA is a form of "spread-spectrum" signaling, since the modulated coded signal has a much higher data bandwidth than the data being communicated.

In this first embodiment, the coding is simply used to identify a channel number. Modulation is accomplished by bringing pointing objects or contacts into proximity to junctions in the electrode grid.

In an alternative embodiment, FDMA or frequency-division multiple access divides the physical channel by frequency into sub-channels using sub-carriers. Orthogonal sub-carrier frequencies are simply multiples of each other. No coding of each channel is necessary using FDMA. Modulation is again accomplished by a contact's relative position to sub-carrier electrodes on the electrode grid. Frequency division multiple access is essentially identical to Coded Orthogonal Frequency Division Multiplexing (COFDM) and Discrete Multi-tone Modulation (DMT).

In the FDMA method, the sub-carrier frequencies are chosen so that the sub-carriers are orthogonal to each other, meaning that the cross-talk between the sub-channels is eliminated and inter-carrier guard bands are not required.

CDMA Measurement Method:

In the CDMA embodiment of the present invention, CDMA exploits mathematical properties of orthogonality between vectors representing the data strings. For example, binary string "1011" is represented by the vector (1,0,1,1).

Vectors can be multiplied by taking their dot product and then summing the products of their respective components. If the dot product is zero, the two vectors are said to be orthogonal to each other.

The present invention can utilize the concept of a matrix. For example, a Walsh matrix is a specific square matrix, with dimensions, that are a power of 2, the entries of which are +1 or −1, and the property that the dot product of any two distinct rows (or columns) is zero, as shown in the Walsh matrix shown in FIG. 3.

Alternatively, the present invention can utilize other matrix types, such as various Hanamard style vectors that will also satisfy the requirements of the present invention.

Adjusting the polarity on a plurality of drive electrodes in a STOMP will provide independent channels that can be multiplexed together on the surface and later separated and sampled.

It is also important to consider "balance". Balance is achieved by always simultaneously driving equal numbers of in-phase and 180 degree out-of-phase drive electrodes. In this way, the dynamic range of sense signals is greatly reduced without reducing the amount of modulation of a contact.

The Walsh matrix always produces one (1) completely unbalanced pattern in the first row. Simply omitting this measurement pattern creates individual offsets along each column in the resulting image. This is overcome simply by normalizing the columns in the image array. The result can also be divided by the number of measurements to normalize the absolute amplitude when comparing different axes with differing numbers of electrodes.

It is possible to generate usable vectors using an exhaustive search and enforcing equal numbers of 1 and −1 in each row and zero dot-product between each column. The total number of measurements required to produce a complete image of the surface is given by the equation:

$$\#Measurements = \#Drive\ Electrodes + \#Sense\ Electrode\ Multiplexers - 2.$$

In the present invention, consider an electrode grid with orthogonally placed electrodes. One set of electrodes can be designated the Drive electrodes and the other orthogonal electrodes designated the Sense electrodes. Wherever a Drive electrode and a Sense electrode cross will be referred to as a junction.

When a pointing object comes near a touchpad surface directly over the electrode grid of Drive and Sense electrodes, the amplitude of a codified drive signal on the Drive electrode is modulated, and then multiplexed at each junction. For the purposes of this document, a codified drive signal is being used to mean that as long as the codes are mathematically orthogonal to each other, then the desired information can be separated out.

In our situation, what has been multiplexed together into a single signal is the capacitance at each junction along a Sense electrode. In other words, a single Sense electrode is crossed by multiple Drive electrodes, each crossing defining a junction. What is important to understand is that although these junctions are physically orthogonal electrodes, what matters in the present invention is that the signals are mathematically orthogonal, because this enables the signals to be separated from each other.

Figures 3, 4:
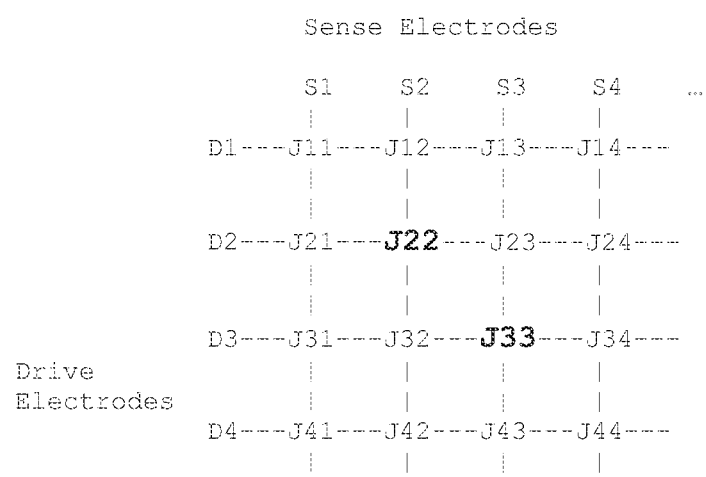
FIG. 3 is an illustration of a Walsh matrix.
FIG. 4 is an illustration of an electrode grid having Drive and Sense electrodes for demonstrating the CDMA concept of the present invention.

FIG. 4 is an example of how the CDMA method can be used in the present invention to detect multiple objects on a capacitance sensing surface. In this figure, a 4×4 sensor is shown with two contacts placed at junctions 22 and 23, designated as J22 and J33. FIG. 4 is an orthogonal electrode grid of four Sense electrodes and four Drive electrodes. The junctions are labeled accordingly. However, it should be understood that the size of the electrode grid can be expanded in one or both directions. The capacitance at each junction can be determined by finding the dot-product of each orthogonal vector. The result is a capacitive image of the entire surface of the touchpad.

FIG. 5 shows the STOMP electrode patterns from above for the drive electrodes D1-D4. At each time (t) the corresponding drive electrode is driven in-phase (1) or 180 degrees out-of-phase (−1) for a certain number of cycles. Each sense electrode is sampled after synchronously rectifying and integrating the resulting induced currents from each drive electrode toggle event. The induced current in each sense electrode is the sum of the currents induced at each junction along the sense electrode as shown in FIGS. 6 and 7.

FIG. 8 shows the computation of the dot product for this example, and FIG. 9 shows the dot product in matrix summary form. Thus, in this CDMA embodiment, the present invention obtains an image of the capacitance sensing surface after only 4 measurements that show attenuation by contacts placed at J22 and J33. Observation of the image shows that each sense electrode acts as an individual sensor and illustrates how this method is applied to a simple linear sensor.

Figure 10:
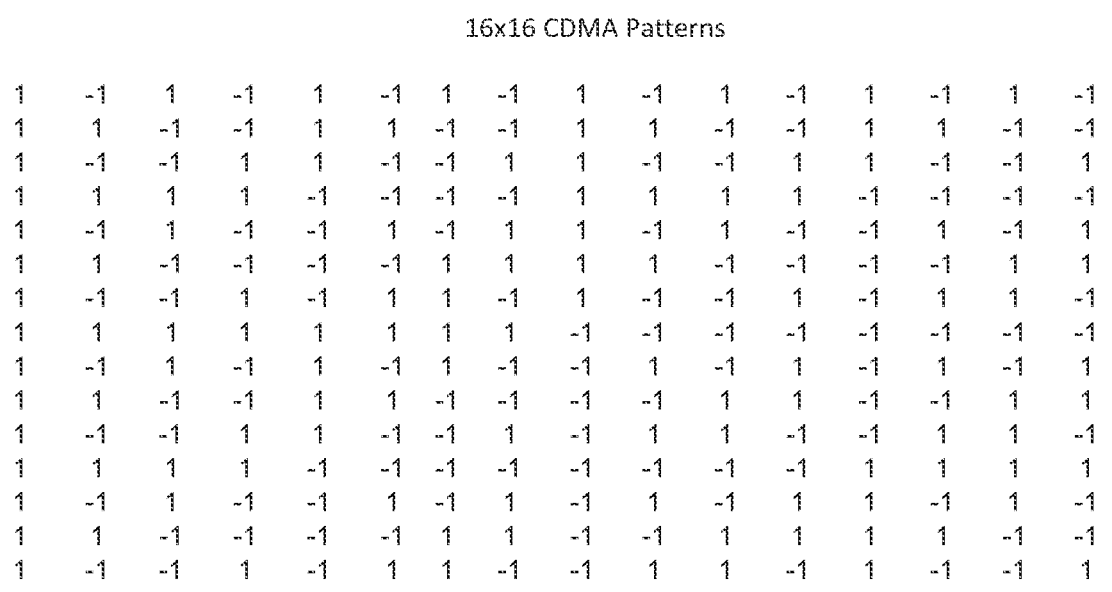

FIG. 10 is provided as an example of STOMP patterns for use with a 16×16 electrode grid. An ideal example of a touchpad with 16 drive electrodes and 16 sense electrodes, with six (6) contacts and no noise is shown. The contacts are illustrated on the surface using example junction capacitance values in FIG. 11, with theoretical ADC measurements shown in FIG. 12. The resulting image of junction capacitance is shown in FIG. 13.

The entire image is generated in only 15 measurements. The report rate is approximately 350 reports/second given the current measurement method of 500 KHz toggle rate and 128 cycles per measurement. This is almost 1 Mb/s data rate for 16 bits/junction. Signal to noise is improved over prior art tracking methods that attempt to electrically track individual contacts. The numbers above are for illustration purposes only and should not be considered to be limiting.

Another aspect of the present invention is directed toward the energy being used by the touchpad. One prior art method of capacitance touchpad operation using maxima and minima uses sequential scanning of electrodes. The result is that some electrodes are energized or have a signal applied while others are de-energized and have no signal applied.

In contrast, in the present invention, all electrodes are energized and are therefore "on" at the same time. Each junction is toggled during each measurement. The result is that each junction has power applied at all times and has an equal amount of power. One effect of this equalization of power distribution is that noise effects the entire electrode grid more uniformly, thus decreasing its effect on the measurements.

FDMA Measurement Method:

In FDMA, the sub-carrier frequencies are chosen so that the sub-carriers are orthogonal to each other, meaning that cross-talk between the sub-channels is eliminated and inter-carrier guard bands are not required. Instead of using digital patterns to separate channels into junctions, FDMA uses orthogonal frequencies.

Orthogonal frequencies are simply multiples of a base frequency. These frequencies may optionally be shifted together to form sub-carrier frequencies. In the same way that CDMA signals are placed on drive electrodes and modulated by the contacts on the surface and multiplexed by the sensor onto sense electrodes, FDMA places unique frequencies on the drive electrodes which are modulated and multiplexed together onto the sense electrodes. Each junction is then identified or addressed by separating and detecting the amplitude for each sub-carrier on each sense electrode and accumulated into junction values forming a capacitance image of the surface.

Figure 14:
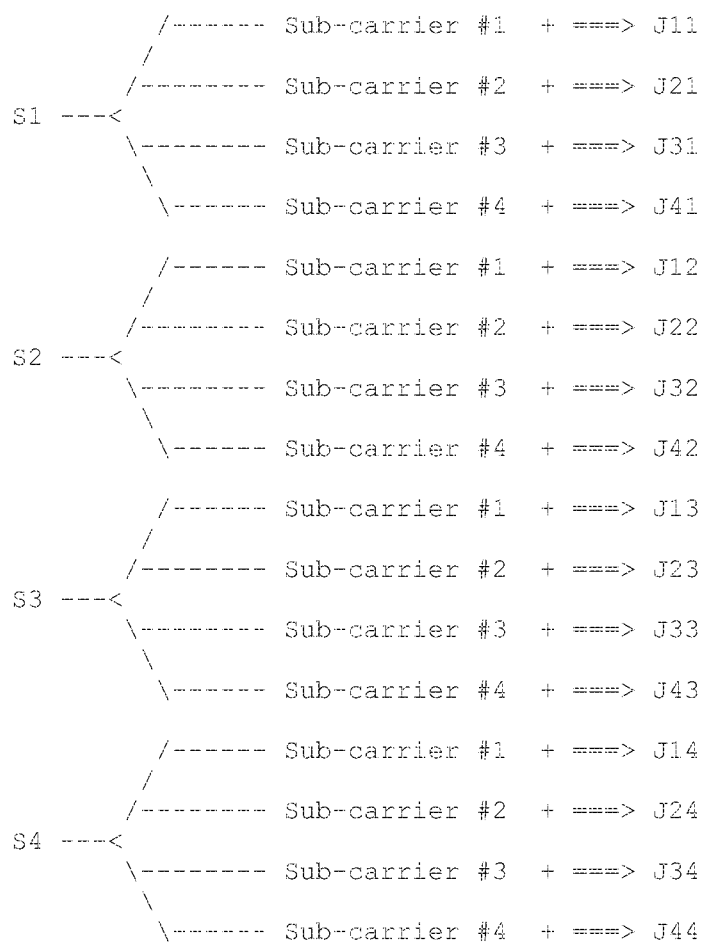
FIG. 14 illustrates touchpad junctions using the FDMA measurement embodiment of the present invention on a 4×4 electrode matrix.

Referring to a 4×4 electrode matrix, FIG. 14 illustrates touchpad junctions using the FDMA measurement embodiment of the present invention. It is still necessary to extract contact information from the measurement data that is collected. The contact extraction method of the present invention is capable of preventing the effect of one contact on other contacts, determining whether contact is finger or palm or non-intended, and providing a more precise way of finding center of contact than a method such as determining maxima between minina.

Figure 15:
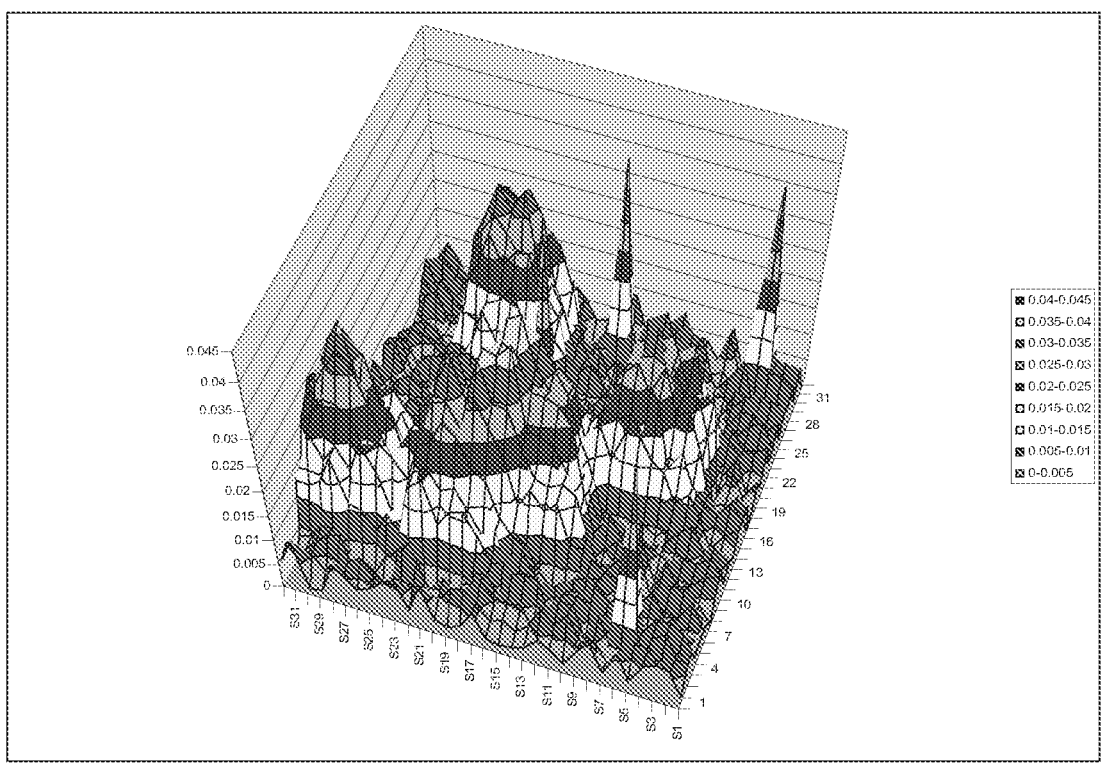
FIG. 15 is a graphical representation of the raw measurement data that shows contacts and noise that is collected using the present invention.

The effect of placing a contact on the surface is spread out potentially across several electrodes and superimposed across other contacts that may be on the surface. This concept is illustrated in FIG. 15. FIG. 15 shows five contacts on the touchpad with "sparkle noise" and "white noise".

Figure 16:
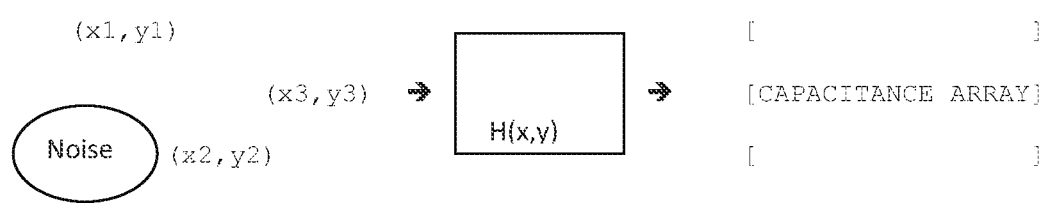
FIG. 16 is a system model can be constructed by placing multiple contacts at various x/y coordinate positions on the touchpad as inputs to a transfer function with the image shown in FIG. 15 as output.

FIG. 16 shows that a system model can be constructed of placing multiple contacts at various x/y coordinate positions on the projected capacitance sensor as inputs to a transfer function with the capacitance image above as output.

The input to the system is comprised of a superposition of broadband noise and contact positions. Each contact position is translated by the transfer function of the system, H(x,y), based on the electric field projection and subsequent modulation of the capacitance at each junction. The resulting impulse response of each contact can be approximated as a Gaussian distribution, and is illustrated by the equation:

$$\text{Value}(ix,iy)=(1.0/\text{pow}(2.0*3.1415927*\text{sigma2},1.5))*\exp(-((fx*fx+fy*fy+fz*fz)/(2*\text{sigma2})));$$

The effect of the transfer function on the noise is uniform. If there is some knowledge about the approximate nature of the transfer function and the general shape of the noise it is possible to reverse the effect of the system and recover the input contact positions.

Given the general solution of the system as:

$$\text{Capacitance Array}=(\text{Contact1}+\text{Contact2}+\ldots+\text{Noise})*H(x,y)$$

where * is the mathematical convolution operator, it is possible to reverse the process as:

$$\text{Contact1}+\text{Contact2}+\ldots+\text{Noise}=\text{Deconv}(\text{Image Array},H(x,y))$$

It is noted that convolution is a mathematical operation on two functions f and g, producing a third function that is typically viewed as a modified version of one of the original functions similar to cross-correlation. Deconvolution is a mathematical operation used to reverse the effects of convolution on recorded data.

With the assumption that the Noise is uniformly distributed with relatively constant power spectral density a smoothing filter may be applied as part of the deconvolution or cross correlation to perform better pattern matching of the contacts and reduce the effect of noise.

Figure 17:
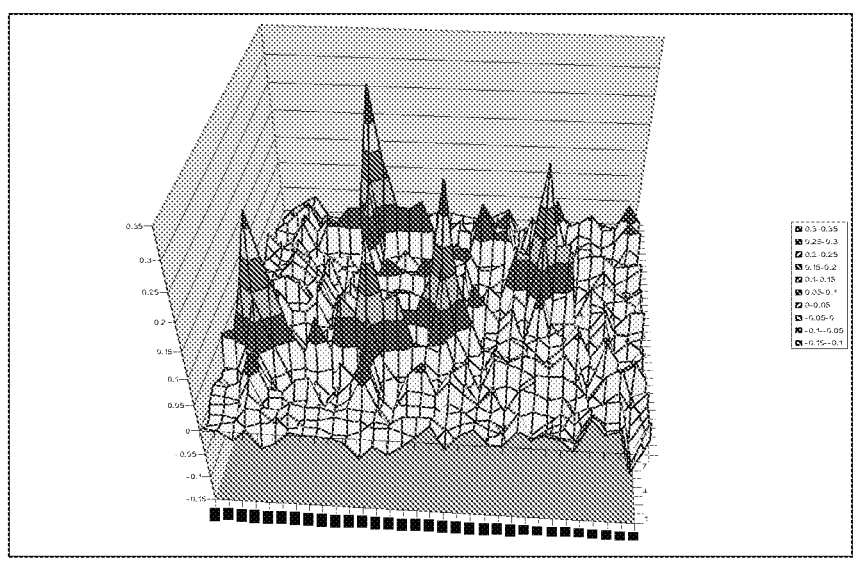
FIG. 17 is a graphical illustration showing extracted contacts in three dimensions.

FIG. 17 shows the result of performing this process on the surface capacitance image shown in FIG. 15. This figure shows the extracted contacts in three dimensions.

Figure 18:
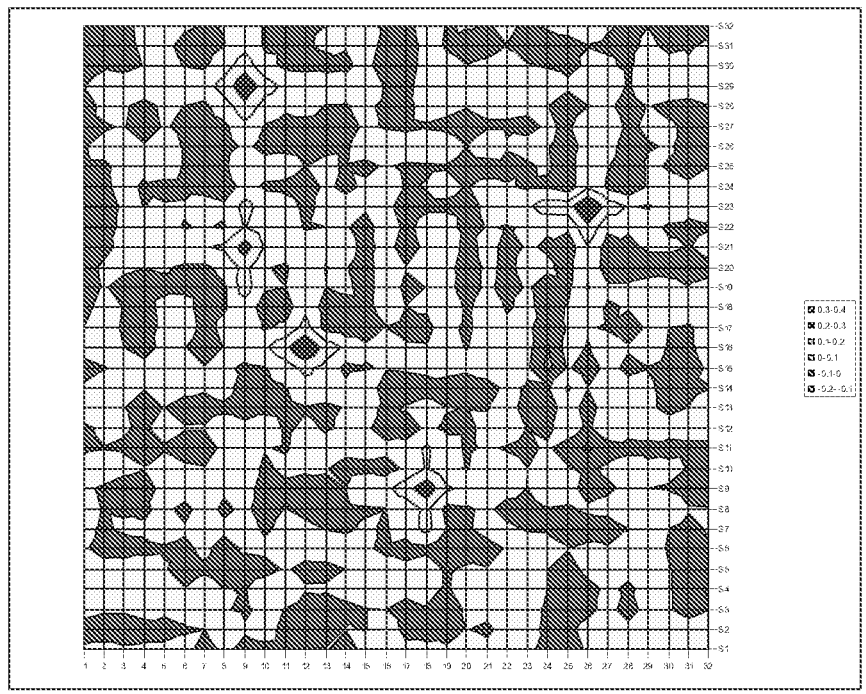
FIG. 18 is a two dimensional view of the extracted contacts.

FIG. 18 is provided to illustrate a two dimensional view of the extracted contacts. The five contact points are identified as items 100.

Coordinate Extraction Method:

Once the data has been collected, it is not yet possible to know the location of contact points on the touchpad. The extracted contact array must be processed to produce individual x/y coordinate pairs for each contact. This is done using a contact tracking algorithm. First contact candidates are created by subsequent searches for the highest value in the array. The contact center or "bean" is determined using a predetermined radius around highest value. The process is repeated producing a predetermined number of contact candidates. The coordinate of each contact is determined using a weighted calculation of all values within the contact radius.

Once the candidate contacts are determined they are given to a host. The host then assigns a contact identifier. Contacts that are assigned an identifier are classified as "active contacts". In this state, subsequent measurements are used to determine when the contact changes to a "dropped contact". Dropped contacts can then be replaced by contact candidates produced in subsequent measurements.

Figure 19:
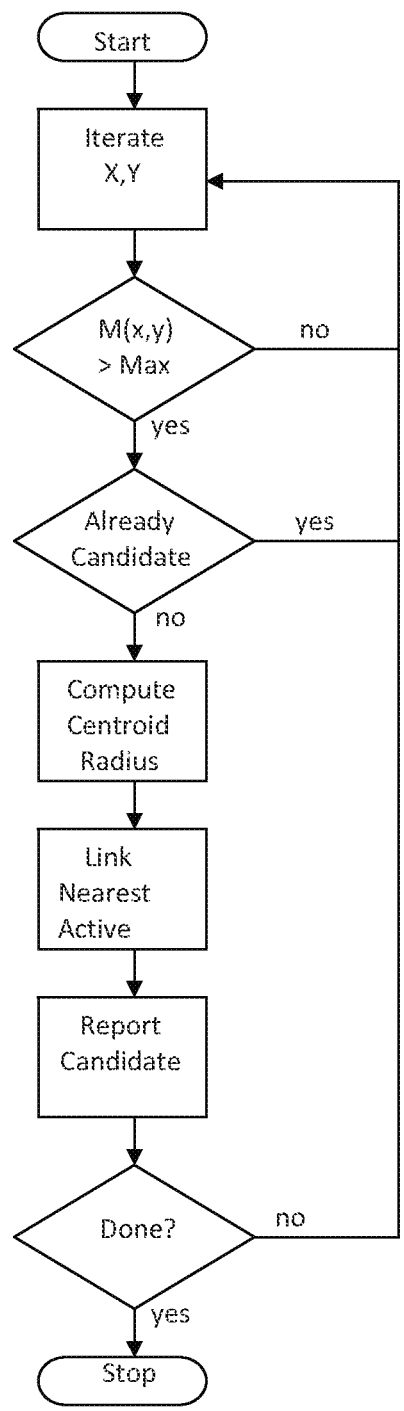
FIG. 19 is a flowchart showing the steps of the Coordinate Extraction Method.

FIG. 19 is a flow chart showing the steps of the Coordinate Extraction Method described above.

The present invention also supports the identification and tracking of a single or multiple contact flick gesture, where a user quickly swipes a single or multiple contacts across the touchpad in a particular direction, or in the case of multiple contacts makes a rotational motion. The contacts are moved together to indicate some gesture action to be performed, such as page up/down or next/prev.

The measurement report time required for extracting coordinate data is often very long compared to the time required for extracting rapid gestures such as flicking fingers across the surface. A technique is introduced to extract gestures created by rapid motion by one or more contacts across the surface in a particular direction. Performing Cross Auto-correlation in time can accurately determine such a gesture without tracking individual contacts. The result is a single number for the correlation of motion in each direction and can be reported simply as 1, −1 or 0 depending on a detection threshold. Thus, the detection threshold can be adjusted in order to catch the desired flick gesture.

It is also possible to extract very complicated gestures such as scrunching or expanding multiple fingers. In practice this can be accomplished also by performing a three (3) dimensional deconvolution of the capacitance images by stacking the subsequent images in the Z-axis. The resulting deconvolved array consists of three dimensional vectors indicating trajectory of each contact.

Electrode Configurations:

There are several different drive and sense configurations of electrodes that can be used to implement the concepts of the present invention, with each method giving different results.

Figure 20:
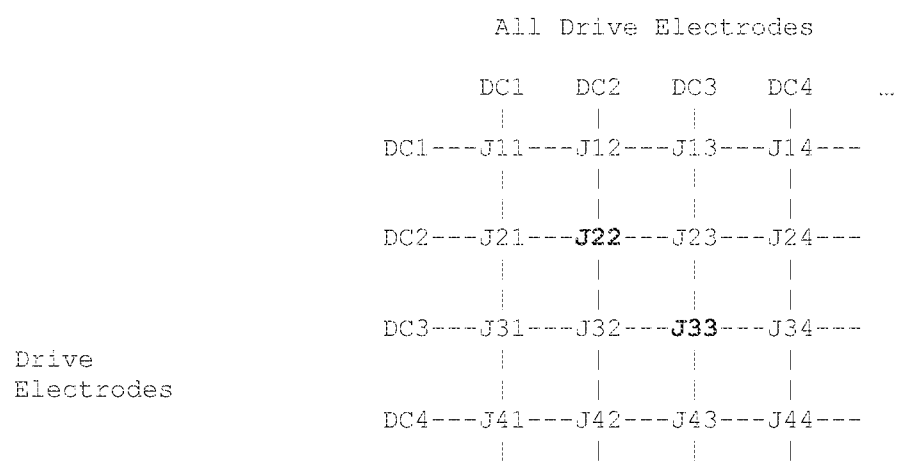
FIG. 20 illustrates the concept of all drive electrodes having a simple matrix sensor comprised of rows and columns that produces an image of the touchpad surface.

FIG. 20 illustrates the concept of all drive electrodes having a simple matrix sensor comprised of rows and columns, with each drive electrode having a sense. The result will be an image of the touchpad surface. The current induced in each electrode by a change in voltage on the electrode is integrated and sampled to produce synchronous timed orthogonal measurements. The measurements are multiplied by the pattern coefficients and accumulated in junction values. The resulting junction values produce the capacitance image of the surface showing the contact location, size and magnitude. There is no separate sense electrode. The junction capacitance at each junction can be determined and an image of the surface capacitance produced by performing the dot-product of subsequent measurements as follows:

$$J11=DR1(meas1)*I\_DR1(meas1)+DC1(meas1)*I\_DC1(meas1)+\ldots \text{ Summed for the duration of at least one period or pattern} \ldots$$

Figure 21:
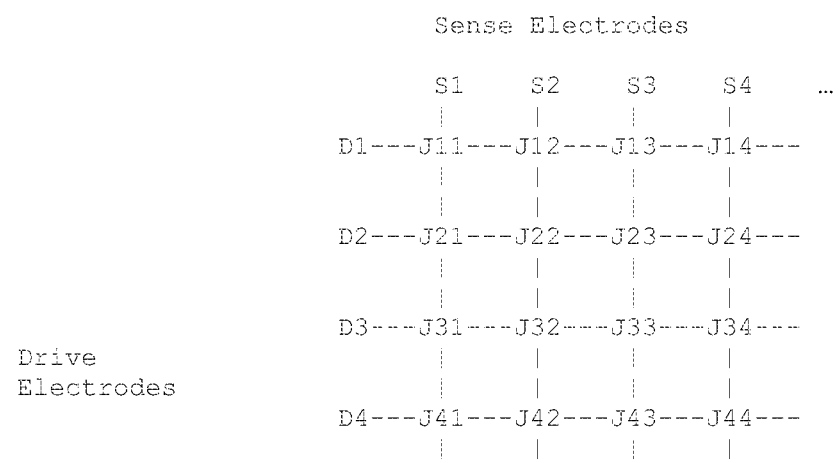
FIG. 21 illustrates an alternative embodiment that uses rows of drive and columns of sense electrodes to create an all points addressable (APA) image of the touchpad surface.

FIG. 21 is another embodiment that shows a simple matrix sensor comprised of rows of drive electrodes and columns of sense electrodes. Drive electrodes are placed near sense electrodes at 90 degrees forming the rows and columns respectively. They form junctions at each row/column intersection. The current induced in each sense electrode by a change in voltage on each drive electrode is integrated and sampled to produce synchronous timed orthogonal measurements. The amplitude of each codified drive signal is modulated by contacts on the surface and multiplexed at each junction.

The junction capacitance at each junction can be determined and an image of the surface capacitance produced by performing the dot-product of subsequent measurements as follows. In the case of CDMA measurements the junction accumulators are produced by computing the dot product according to the formula:

$$J_{ds} = \sum_{t=1}^{\#\,Drives} Pattern_d(t) * Measurement_s(t)$$

In the case of FDMA measurements the junction accumulators are produced by integrating for the duration of at least one period of the fundamental sub-carrier.

Figure 22:
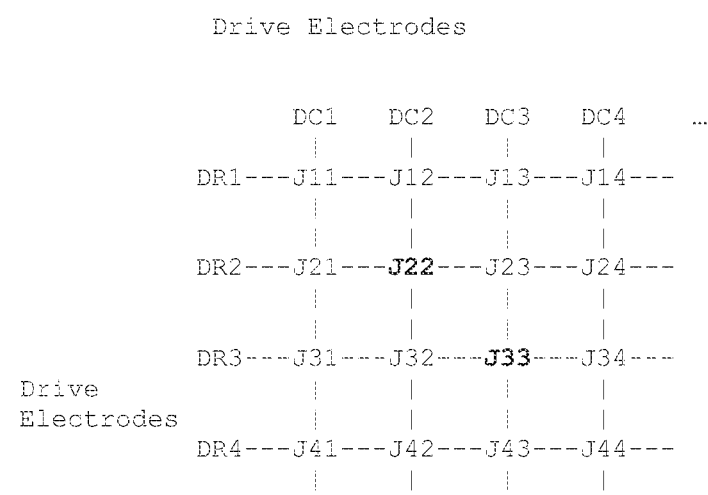
FIG. 22 illustrates an alternative embodiment that produces an axis view of the touchpad surface.

FIG. 22 is another embodiment is a simple matrix sensor comprised of rows and columns of drive electrodes and a single sense electrode. Drive electrodes are placed near the sense electrodes at 90 degrees forming the rows and columns respectively. They form long junctions along each row and column. The current induced in the sense electrode by a change in voltage on each drive electrode is integrated and sampled to produce synchronous timed orthogonal measurements along each axis. The amplitude of each codified drive signal is modulated by contacts on the surface.

The junction capacitance along each electrode can be determined and an X and Y contour of the axis capacitance produced by performing the dot-product of subsequent measurements as follows. In the case of CDMA measurements the junction accumulators are produced by computing the dot product according to the formula:

$$J_d = \sum_{t=1}^{\#\,Drives} Pattern_d(t) * Measurement(t)$$

Again, in the case of FDMA measurements the junction accumulators are produced by integrating for the duration of at least one period of the fundamental sub-carrier.

Figure 23:
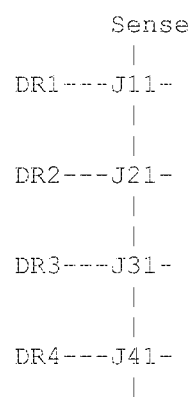
FIG. 23 illustrates an alternative embodiment that is for a linear touchpad sensor.

FIG. 23 shows another embodiment which is a simple linear sensor comprised of rows and a single sense electrode. Drive electrodes are placed near the sense electrodes at 90 degrees forming a linear or circular shape. They form short junctions along the sense electrode. The current induced in the sense electrode by a change in voltage on each drive electrode is integrated and sampled to produce synchronous timed orthogonal measurements along each axis. The amplitude of each codified drive signal is modulated by contacts on the surface.

The junction capacitance along each electrode can be determined and the axis capacitance produced by performing the dot-product of subsequent measurements as follows. In the case of CDMA measurements the junction accumulators are produced by computing the dot product according to the formula:

$$J_d = \sum_{t=1}^{\#\,Drives} Pattern_d(t) * \text{Measurement}(t)$$

Again, in the case of FDMA measurements the junction accumulators are produced by integrating for the duration of at least one period of the fundamental sub-carrier.

Figure 24:
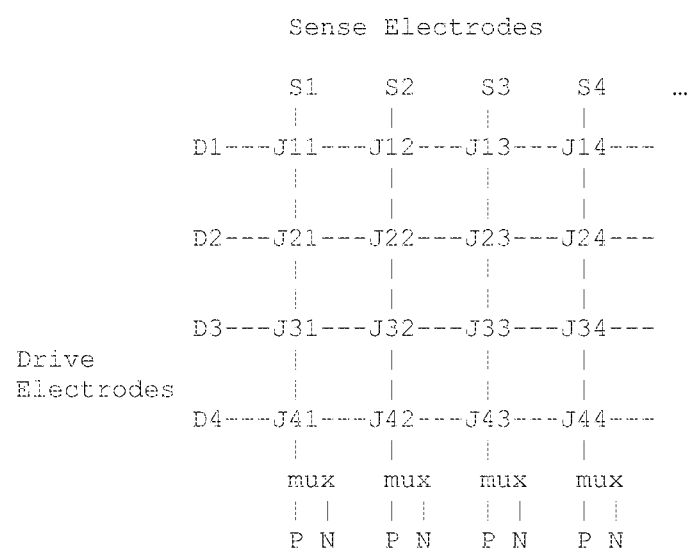
FIG. 24 illustrates a final alternative embodiment having a simple matrix sensor comprised of rows of drive electrodes and columns of sense electrodes connected via a multiplexer to either positive or negative sense.

FIG. 24 shows a final embodiment having a simple matrix sensor comprised of rows of drive electrodes and columns of sense electrodes connected via a multiplexer to either positive or negative sense. Drive electrodes are placed near sense electrodes at 90 degrees forming the rows and columns respectively. They form junctions at each row/column intersection. The current induced in each sense electrode by a change in voltage on each drive electrode is integrated and sampled to produce synchronous timed orthogonal measurements. The amplitude of each codified drive signal is modulated by contacts on the surface and multiplexed at each junction. The use of longer orthogonal patterns to include the sense multiplex control signals provides a mechanism for addressing all junctions of the sensor.

The junction capacitance at each junction can be determined and an image of the surface capacitance produced by performing the dot-product of subsequent measurements as follows.

In the case of CDMA measurements the junction accumulators are produced by computing the dot product according to the formula:

$$J_{ds} = \sum_{t=1}^{\#\,Drives} Pattern_d(t) * Pattern_s(t) * Measurement_s(t)$$

where the STOMP pattern is a concatenation of $Pattern_d$ and $Pattern_s$.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for detecting the presence of multiple objects on a touchpad, said method comprising:
   1) providing a touchpad with two co-planar sets of electrodes arranged as orthogonal arrays, wherein a first set of electrodes act as drive electrodes, and a second set of electrodes act as sense electrodes;
   2) simultaneously stimulating all of the drive electrodes using modulated stimulus signals having arbitrary amplitudes formed by orthogonal codes that do not have phase orthogonality, wherein all permutations of orthogonal code dot products are equal to zero; and
   3) receiving measurement data regarding capacitance at each electrode junction.

2. The method as defined in claim 1 wherein the method further comprises dividing each of the drive electrodes into sub-channels using sub-carriers for use with the orthogonal code sets.

3. The method as defined in claim 1 wherein the method further comprises maintaining balance on the drive electrodes by having an equal number of in-phase and out-of-phase drive electrodes.

4. The method as defined in claim 1 wherein the method further comprises processing the measurement data to thereby generate an image of all contacts on a surface of the touchpad.

5. The method as defined in claim 1 wherein the method further comprises processing the measurement data using de-convolution of a predefined transfer function to determine a location of the contacts.

6. The method as defined in claim 1 wherein the method further comprises processing the measurement data using cross correlation of a predefined transfer function to determine location of the contacts.

7. The method as defined in claim 1 wherein the method further comprises processing the measurement data using cross auto-correlation in time to determine motion of the contacts.

* * * * *